United States Patent [19]
Ketcham et al.

[11] Patent Number: 5,420,742
[45] Date of Patent: May 30, 1995

[54] DEGAUSSER FOR TAPE WITH PLURAL RECORDED SEGMENTS

[75] Inventors: Donald B. Ketcham, Lakeville; Robert P. McCollam, Roseville; Kent R. Kalar, Vadnais Heights, all of Minn.

[73] Assignee: Minnesota Mining and Manufacturing, St. Paul, Minn.

[21] Appl. No.: 99,619

[22] Filed: Jul. 30, 1993

[51] Int. Cl.⁶ .................................................. H01F 13/00
[52] U.S. Cl. ................................... 361/151; 361/267; 360/66
[58] Field of Search .............. 361/149, 151, 261; 360/15, 16, 66, 118

[56] References Cited

U.S. PATENT DOCUMENTS

| | | | |
|---|---|---|---|
| 2,526,358 | 10/1950 | Howell | 360/66 |
| 2,535,498 | 12/1950 | Kornei | 360/118 |
| 2,796,359 | 6/1957 | Speed . | |
| 3,627,580 | 12/1971 | Krall | 427/549 |
| 4,003,336 | 1/1977 | Koester et al. | 361/151 |
| 4,631,602 | 12/1986 | Chouinard et al. | 360/16 |
| 4,703,230 | 3/1988 | Helfrick | 361/151 |
| 4,897,759 | 1/1990 | Becker | 261/151 |
| 5,148,403 | 9/1992 | Gardner | 360/15 |
| 5,204,801 | 4/1993 | Becker et al. | 361/151 |

FOREIGN PATENT DOCUMENTS 2195198A  3/1988  United Kingdom .

Primary Examiner—Jeffrey A. Gaffin
Attorney, Agent, or Firm—Gary L. Griswold; Walter N. Kirn; Charles D. Levine

[57] ABSTRACT

This method produces a tape having a plurality of recorded segments separated by cue tones and having a reduced tendency to generate false cue tones. The method includes applying a layer of a liquid dispersion to a nonmagnetic substrate. The method also includes the steps of orienting the pigment by applying a magnetic field, solidifying the layer of liquid dispersion on the substrate, and applying a demagnetizing field to the layer to neutralize the remanent magnetization.

12 Claims, 3 Drawing Sheets

DEGAUSSER FOR TAPE WITH PLURAL RECORDED SEGMENTS

TECHNICAL FIELD

The present invention relates to neutralizing remanent magnetic fields in magnetic recording media. More specifically, the present invention relates to neutralizing remanent magnetization on a large scale to reduce cue tone error in contact duplication of magnetically recorded material.

BACKGROUND OF THE INVENTION

There is a well-recognized need to produce duplicate copies of magnetically recorded signals, such as with video cassettes of motion pictures and educational materials. Production of small numbers of duplicate copies of magnetically recorded tapes is often performed by simply playing the original tape into a second tape recorder. If larger numbers of copies are needed, however, a process called contact duplication can be faster and more efficient.

Contact duplication involves creating an original recording, called a master, which is then placed in direct contact with a recording medium, such as a blank recording tape. Once the two media are in contact, a transfer means, such as heat or a magnetic field, is applied to the combined media, which causes the magnetically recorded signals on the master to produce a magnetic impression of one of the original signals on the recording medium.

If the transfer means is heat, the process is commonly called "thermomagnetic duplication" or "thermoremanent duplication." In thermomagnetic duplication, a recording medium such as chromium dioxide, chosen because of its low Curie temperature, is used as the recording medium. By quickly heating the recording medium above its Curie temperature, and then cooling it below its Curie temperature while maintaining it in intimate contact with the master, the magnetic fields due to the signals recorded on the master tape induce similar fields in the recording tape. A process and apparatus for carrying out duplication of magnetic tapes by this method, using a laser beam as the heat source, is disclosed in U.S. Pat. No. 4,631,602.

Signals also can be transferred from the master to the recording media by applying a strong magnetic field to the combination of the two contacting media. A tape duplicating system which uses this signal transfer method is disclosed in U.S. Pat. No. 5,148,403.

In a typical manufacturing process for duplicating programs for videocassettes, several copies of a program are contact duplicated onto a length of tape, which is then rolled into a large roll, called a pancake, for loading into cassettes. Referring to FIG. 1, tape 10 typically contains a leading length 12, followed by a segment 14 which contains a recorded program, followed by segment 16, which contains recorded signal, called a cue tone 18, followed by second recorded program 14. Additional segments and cue tones may follow.

To make a cassette, the pancake is placed in a cassette loading apparatus, and a cassette, having a leader attached to a supply reel is also placed in the loading apparatus. A program segment 14 is attached to the leader and is wound onto the cassette reel. When the loading apparatus senses the signal from the cue tone 18 following this program segment, it stops the winding, cuts the tape 10, and splices the trailing end of the tape (at the end of the segment 14) onto a length of transparent film attached to the takeup reel in the cassette being loaded.

A troublesome problem in some cassette loading processes is cue tone error caused by remanent magnetization in the recording tape. Such remanent magnetization is typically the result of magnetic orientation fields applied to the magnetic recording medium during manufacture as disclosed, for example, in U.S. Pat. No. 2,796,359. Cue tone error can lead to a condition where the tape cutting operation loses synchronization with the programs recorded on the tape, resulting in a cassette containing the end of one program followed by the beginning of another.

Demagnetization, or erasing, of recording tape is well known, since it is commonly done in magnetic tape recording apparatus, where magnetic tape is frequently recorded over, and it is desirable to erase the old signals prior to recording the new.

A simple apparatus for erasing magnetic recordings in a tape recorder is disclosed in U.S. Pat. No. 2,535,498. Two permanent bar magnets are used to magnetize the recording medium to alternating polarities, with fields of progressively diminishing strength.

A direct-current, electromagnetic erase head, which first subjects the medium to a saturating magnetic field of one polarity and then applies a field of reverse polarity of such magnitude to just bring the medium to zero magnetization, is disclosed in published British Patent Application No. GB 2 195 198.

An apparatus for erasing an entire roll of tape contained in a cassette, without unrolling it, is disclosed in U.S. Pat. No. 5,204,801. The cassette is conveyed through a strong rotating magnetic field which subjects the tape to varying magnetic fields of varying directions. This method of tape demagnetization is sometimes called "bulk degaussing" or "bulk erasure."

A process for removal of remanent magnetization in the sound recording layer to reduce noise in a motion picture film strip is disclosed in U.S. Pat. No. 3,627,580. A series of permanent magnets of alternating polarity, spaced at increasing distance from the medium, is used to demagnetize the magnetic recording layer by subjecting it to magnetic fields of alternating polarity and progressively diminishing strength.

While these devices can demagnetize or erase magnetic tape, they present certain difficulties when it is attempted to apply them, in a cost-effective way, to the demagnetization of recording of media for contact duplication.

In particular, since magnetic recording tape is typically produced as a wide web of magnetic medium which is then slit into tapes, the simplest and most cost-effective place to perform the demagnetization is before slitting. This necessitates a demagnetization apparatus capable of applying a demagnetizing field across a web of material many times the width of a single tape. Strong permanent magnets of large size are expensive, and the resulting apparatus is likely to be extremely heavy and difficult to install in a manufacturing apparatus.

In addition, it is strongly desired that demagnetizing devices used as part of a magnetic media manufacturing operation be of the permanent magnet type, to avoid the expense and hazard of electrical devices. There is a need for an alternative method to demagnetize tape which will be effective against the type of cue tone error described above.

SUMMARY OF THE INVENTION

The inventors have diagnosed an unrecognized cause of cue tone error as being false cue tones generated by remanent magnetization in the blank recording tape used in the contact duplication process. Evidence suggests that a major factor in the loss of synchronization between programs and tape loading is the manner in which the loading apparatus uses the cue tones to sense ends of programs.

The cue tone sensing mechanism is intended to sense cue tones 18 in segments 16 of blank tape between programs. When the process works properly, the sensor encounters a segment 16 of unrecorded tape, followed by a cue tone 18, which precisely locates the desired end of the tape and signals to the loading apparatus to stop loading and cut the tape. The loading apparatus then determines, based upon the length of the program being loaded, when to activate the sensing mechanism to begin looking for the next cue tone 18.

When there is a high level of remanent magnetization in the tape, the inventors have found that the loader senses a false cue tone almost immediately upon activation of the cue tone sensing mechanism, rather than at the point where the real cue tone occurs. The result is that loading is stopped prematurely and the tape cut, at, for example, at the location shown by 20, thereby leaving no blank tape at the end of the program.

Premature cutting of the tape at location 20 can cause the loading apparatus to prematurely activate the cue tone sensor for the end of the next program, which, if another false cue tone is sensed, leads to yet another premature cutting of the tape, and a cumulative error in tape length. Eventually, these premature tape cuttings result in programs being severely cut short, and portions of the succeeding program being added to the portion of tape which is loaded.

The inventors have been able to greatly reduce the cue tone error of this type by demagnetizing the recording medium before thermomagnetic duplication. However, the added cost of commonly known tape demagnetization methods is highly burdensome in the cost-competitive market environment encountered in magnetic tape duplication.

The inventors have recognized that the demagnetization needed for noise reduction in tape recording is of a fundamentally different nature than that needed for reduction of cue tone error. In particular, reduction of recording noise requires that remanent magnetization of the blank medium be eliminated on a small scale, namely the scale of the recorded wavelengths, which is on the order of the scale of the pigment particles. It has been found by the inventors, however, that reduction in cue tone errors only requires that large, or macro, scale remanent magnetization be reduced, and that large scale demagnetization can be achieved with a simple and cost effective process which can be applied to wide webs of recording media.

In one embodiment of the present invention, reduction in large scale remanent magnetization is achieved by first switching all magnetic pigment particles in the recording medium to one direction of magnetization by applying a saturating field. Then a lower strength field of opposite polarity is applied to switch the polarity direction of the magnetic particles having coercivity below the reverse field strength. The result is a large scale cancellation of fields.

DETAILED DESCRIPTION OF PREFERRED EMBODIMENTS

Where a magnetic recording medium is prepared by coating a liquid dispersion containing magnetic pigment and a polymeric binder onto a nonmagnetic substrate, followed by orientation of the pigment and solidification of the binder, a primary source of remanent magnetization is the magnetic field used to orient the pigment. It is quite common to find that the magnetic pigment is magnetically saturated in the orientation direction.

Figure 1:
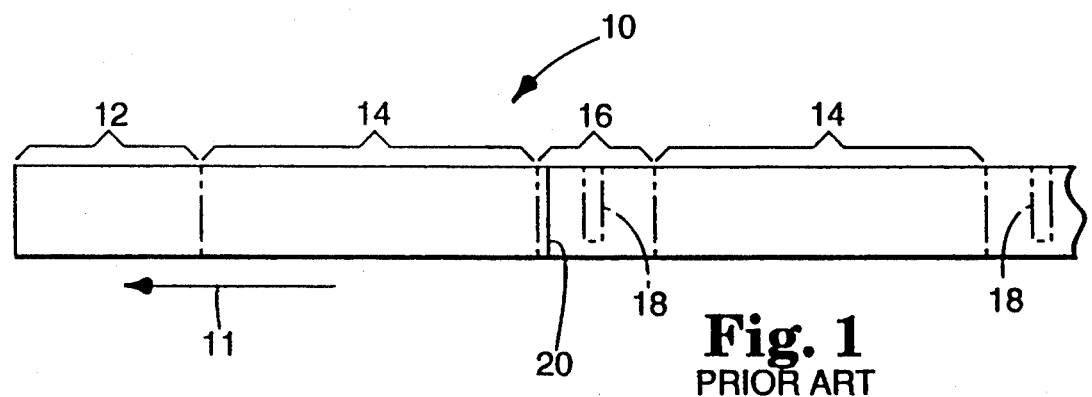
FIG. 1 is a schematic view of a duplicated tape.
Figure 2:
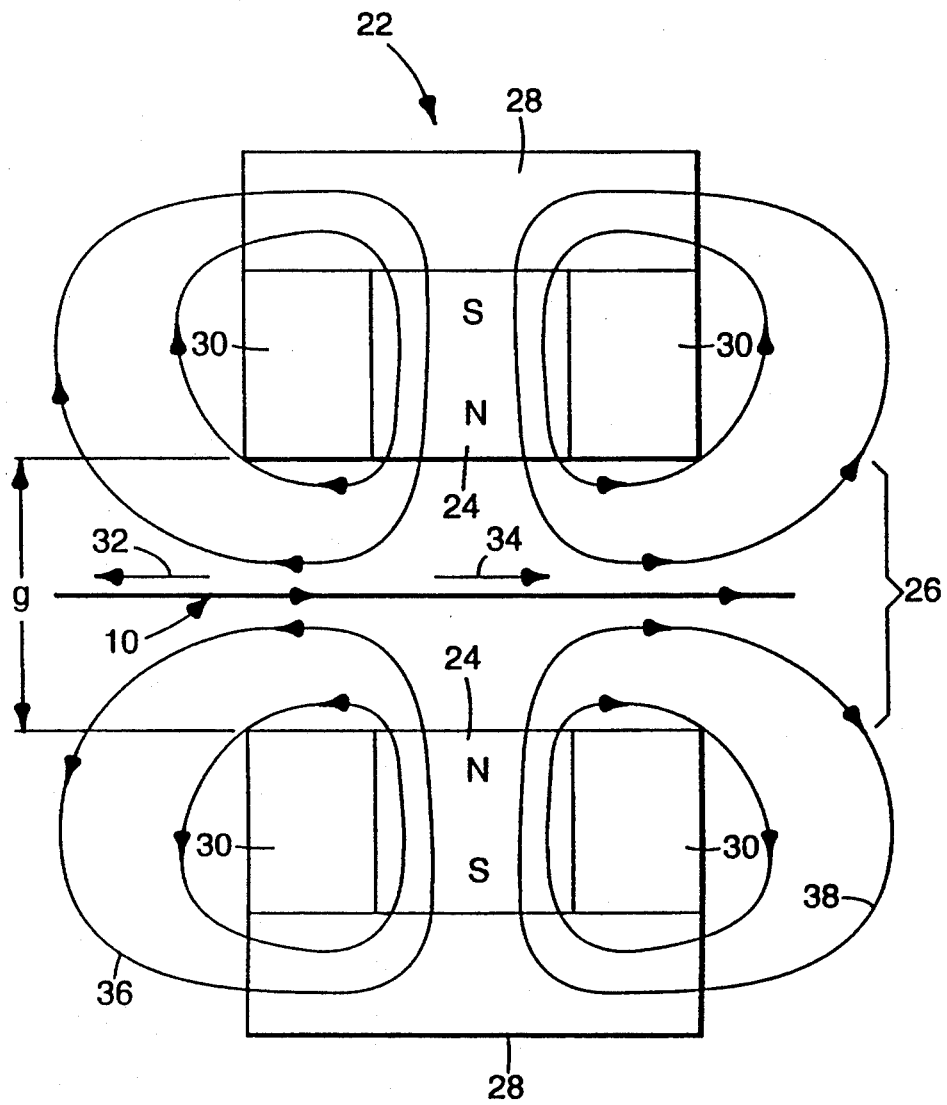
FIG. 2 is a schematic view of a demagnetizing slot assembly of the present invention.

In a first embodiment of the present invention, magnetic tape which is known to be magnetically saturated due to a previously applied magnetic field is magnetically neutralized by application of a demagnetizing field produced by the slot assembly 22 shown in FIG. 2. In this demagnetizing apparatus, two magnets 24 are oriented with like poles facing each other to define a gap 26, having a gap distance g. Each magnet 24 can be mounted on a flux plate 28, as shown, and can be held on the flux plate 28 by two clamps 30. The magnets 24 tend to remain on the flux plate 28 without the clamps 30 but the clamps protect the magnets and prevent the end magnets, when a line of magnets is used as discussed below, from being pushed away from the other magnets.

A web, such as tape 10, having been magnetically saturated in one polarity direction 32 during coating, passes through the gap 26 in a direction 34 approximately midway between the two magnets 24. Flux lines 36, being in the same direction as the saturation remanent magnetization, assure that the tape 10 is in a state of magnetic saturation. However, as the web passes flux lines 38, which are in the opposite polarity direction to the saturation magnetization, partial reversal of the remanent magnetization occurs. As shown, the web direction 34 and the charge direction 32 are opposite each other and the north poles of the magnets 24 face each other. Alternatively, the web direction 34 and the charge direction 32 can be the same with the south poles of the magnets 24 facing each other.

If the strength of the neutralizing field represented by flux lines 38 is equal to or slightly less than the intrinsic coercivity of the magnetic medium, the remanent magnetization of the medium will be very near to zero, as measured by a vibrating sample magnetometer, or VSM. If the magnetic pigment is chromium dioxide, a pigment commonly used in thermomagnetic duplication, the magnetic field strength should range from 600–800 Gauss, although other strengths also could be used. For one family of chromium dioxide pigments, a magnetic field strength of about 714 Gauss has been found suitable.

The strength of the field in the gap 26, represented by the flux lines 36, 38, can be adjusted by adjusting the gap height g, which reduces the field strength. If only one magnet 24 were to be used in this embodiment, the magnetic field would be of similar shape, and, at least in principle, the demagnetizer should function in a similar manner, although additional vertical components of magnetization could remain on the tape. Using two magnets, however, provides a stronger magnetic field, due to superposition of two fields, and also reduces the variation in field strength across the gap distance g, thereby making the device more tolerant of tape movement between the magnets 24 during operation.

The field strength is also enhanced by the flux plates 28, which can be made of a soft magnetic material, such as steel, and which hold the side clamps 30, which can be made of a nonmagnetic material such as aluminum. Each magnet 24, flux plate 28, and pair of clamps 30 form a magnet assembly. The two magnet assemblies are held in place relative to each other to form a single slot assembly 22 by clamping or other known holding methods.

For best effectiveness, this slot assembly 22 can be oriented relative to the orientation field of the coating apparatus, so that the orientation 32 of the tape 10 is in the same direction as flux lines 36 as the tape 10 enters the slot assembly 22, thereby assuring that the flux lines 38 will run in the opposite direction as the tape 10 leaves the slot assembly 22 to produce the desired neutralization of remanent magnetization. This is accomplished when the web direction 34 and the charge direction 32 are opposite each other and the north poles of the magnets 24 face each other. Alternatively, this is accomplished when the web direction 34 and the charge direction 32 are the same with the south poles of the magnets 24 facing each other. In a manufacturing setting, the need for proper orientation of the demagnetizer can lead to error in use, since those who install the demagnetizer may not fully appreciate its principle of operation. This, and other improvements, can be achieved by the embodiment shown in FIG. 3.

Figure 3:
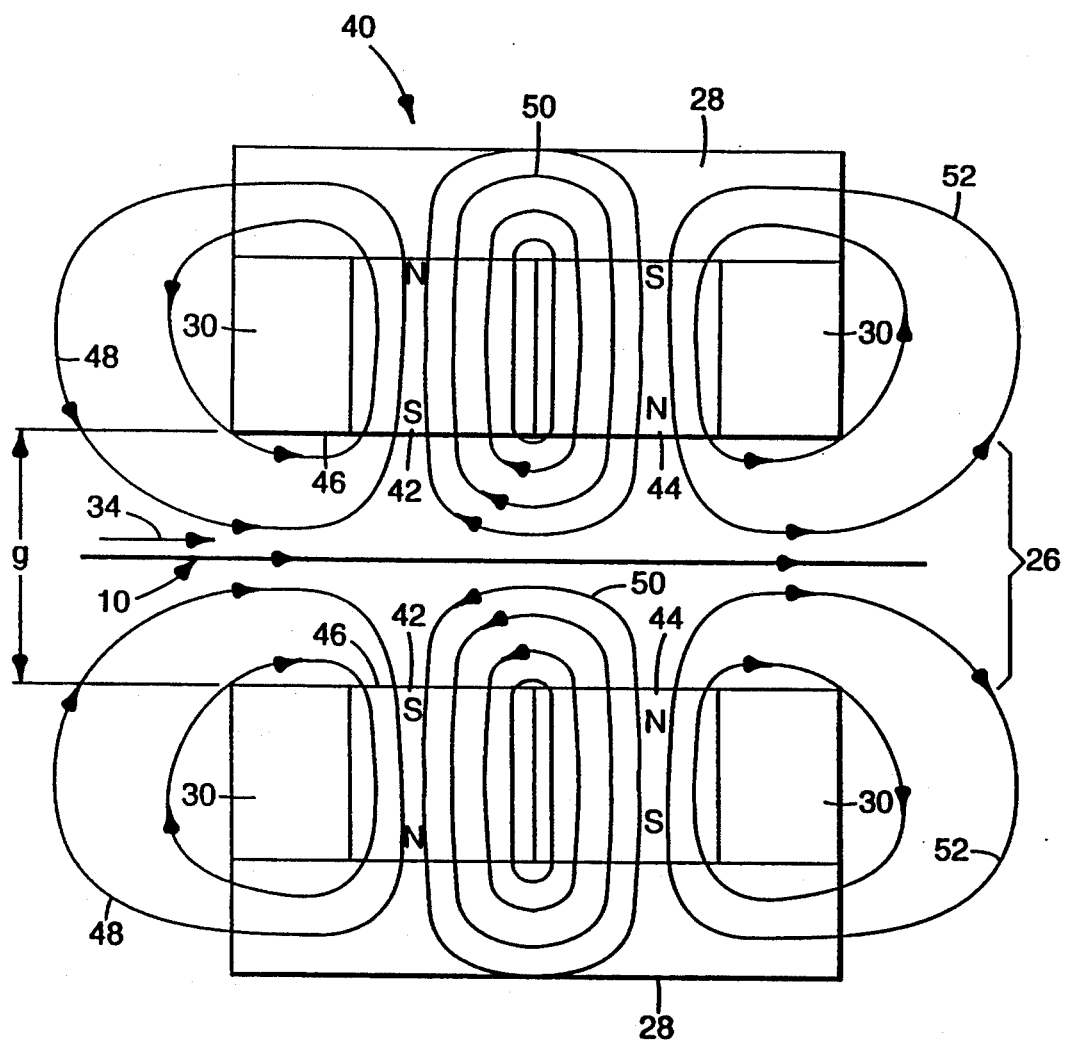
FIG. 3 is a schematic view of another embodiment of the demagnetizing slot assembly.

In the embodiment of FIG. 3, the slot assembly 40 provides its own saturation field before applying the neutralization field. This makes it independent of the direction of any previously applied magnetic fields, such as an orientation field applied during coating. In each magnet assembly, two magnets 42, 44 are placed side by side, with opposite poles facing the gap 26, and with the pole faces of the magnets evenly aligned to define pole planes 46, which, in turn, define the gap 26. In FIG. 3, the pole planes 46 are perpendicular to the plane of the figure. The apparatus would work with the pole faces of the magnets not planar, but some flux lines would be skewed.

The magnetic field within the gap 26 is the result of the interaction of the fields of the four magnets contained in magnet assemblies. As the tape 10 enters the gap 26 travelling in direction 34, it first encounters the field represented by flux lines 48 (such as 714 G), followed by the much stronger flux lines 50 (such as 2400 G), produced by the combination of magnets 42, 44, which saturate the tape 10 in a first direction. Thus, even if the flux lines 48 are in the opposite direction to the saturation magnetization, the flux lines 50 will saturate the tape 10. Then, as the tape 10 leaves the gap 26, it is subjected to a weaker field 52 (such as 714 G), in the opposite direction, which substantially neutralizes the remanent magnetization produced by the saturating field represented by flux lines 50.

By adjusting the gap distance g, the strength of the magnetic fields to which the tape 10 is subjected can be adjusted, with an increase causing a decrease in field strength. The critical adjustment is, of course, the final field strength, represented by flux lines 52. This adjustment can be made by testing samples of magnetic media using a VSM, and adjusting the gap distance g to obtain the minimum remanent magnetization.

While the embodiments shown in FIGS. 2 and 3 could be made with only the magnets shown, the inventors have found that an additional difficulty is encountered when these embodiments are used on wide webs. This difficulty is that very wide permanent magnets are not readily available at a reasonable cost. Therefore, the configuration shown in FIG. 4 has been devised. In this embodiment, a magnet assembly 54 includes several smaller magnets 56, 58, which are placed in rows and held in place by a flux plate 60 and clamps 62. Only one magnet assembly is shown.

Additionally, it has been found that permanent magnets having sufficiently high strength to be useful in the present embodiment tend to be quite variable in their field strength. As a result, when such magnets are used in the magnet assembly 54, the variation in field strength in the crossweb direction 64 can cause significant variation in the remanent magnetization of magnetic media treated with the apparatus.

To solve this problem, the magnetic field strength can be made significantly more uniform in the crossweb direction 64 if iron or other soft magnetic shims 66 are placed across the faces of magnets 56, 58 in areas of high field strength, to shunt part of the magnetic flux away from the gap.

Because soft iron shims can be readily held in place by the magnetic force of magnets 56, 58, it is relatively easy to adjust the field strength of the magnet assembly 54 by a series of tests on magnetic media passed through the gap, followed by moving the iron shims 66 until a uniformly neutral magnetic media is produced. Alternatively, a field strength meter could be used to test the uniformity of the field.

Magnets 56, 58, along with the clamps 62 and the steel flux plate 60, can be held together by adhesive or other known fasteners. Magnet assemblies can be held in their proper positions with respect to each other by holding or clamping devices known in the art.

Figure 4:
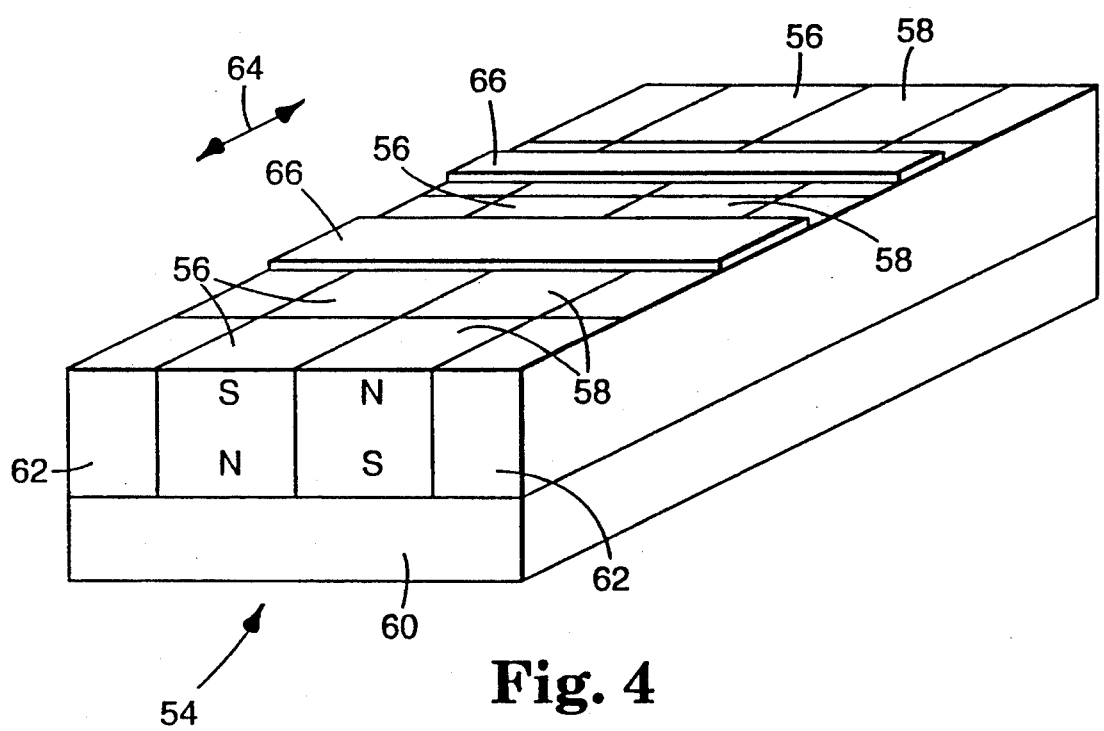
FIG. 4 is a perspective view of another embodiment of the demagnetizing slot assembly.

The demagnetizer of FIG. 4, has been used to neutralize thermomagnetic recording media to a remanent magnetization level of less than 5% of saturation. This was found to be well below the level needed for reducing cue tone errors to an acceptable level in a commercially available cassette loading apparatus.

We claim:

1. A method of reducing the tendency of generating false cue tones on a magnetic recording tape for contact duplication of recorded material, wherein the magnetic tape has a plurality of recorded segments separated by cue tones, wherein the method comprises the steps of:

providing a wide web of magnetic recording tape;

applying a neutralizing field to the wide web of magnetic recording tape to reduce the remanent magnetization on a large wavelength scale larger than the size of the pigment particles, regardless of whether neutralization on a small scale occurs, and to prevent false cue tones from being generated by remanent magnetization; and slitting, after the applying step, the wide web of magnetic recording tape into a plurality of narrower tapes.

2. The method of claim 1, wherein the wide web of magnetic recording tape is capable of being rolled onto a roll, and wherein the applying step is performed while transporting the wide web of magnetic recording tape from a first roll to a second roll.

3. The method of claim 1, further comprising before the applying a neutralizing field step, the step of applying a saturation field to the tape having a higher strength than the neutralizing field to switch all magnetic pigment particles in the recording medium to one direction of magnetization, wherein the polarity of the saturation field is opposite to that of the demagnetization field.

4. The method of claim 3, wherein the neutralizing field has a field strength substantially equal to or less than the intrinsic coercivity of the tape.

5. The method of claim 1 further comprising the step of copying a program onto a plurality of recorded segments separated by cue tones using a contact magnetic duplication process.

6. The method of claim 1 wherein the applying step comprises applying a neutralizing field to the layer to reduce the remanent magnetization on a large wavelength scale without significantly reducing remanent magnetization on a small wavelength scale.

7. An apparatus for producing a uniform magnetic field in a gap to reduce remanent magnetization of a magnetic tape passing through the gap to produce a tape having a plurality of recorded segments separated by cue tones and having a reduced tendency to generate false cue tones, wherein the apparatus comprises:

means for reducing the remanent magnetization on a large wavelength scale larger than the size of the pigment particles in the tape regardless of whether neutralization on a small scale occurs by selecting the strength of the neutralizing field to be equal to or slightly less than the intrinsic coercivity of the magnetic medium, and for preventing false cue tones from being generated by remanent magnetization when the tape passes through the gap past a first set of flux lines before it passes a second set of flux lines by creating a first set of flux lines in the same direction as the remanent magnetization of the tape and a second set of flux lines in the opposite direction to the remanent magnetization of the tape to apply a neutralizing field to the magnetic tape, wherein the reducing and preventing means comprises a first magnet assembly having at least one permanent bar magnet, wherein each bar magnet comprises a first magnetically polarized end, a second, opposite, oppositely-magnetically polarized end, and an intervening portion connecting the ends; and a second magnet assembly having at least one permanent bar magnet, wherein each bar magnet comprises a first magnetically polarized end, a second, opposite, oppositely-magnetically polarized end, and an intervening portion connecting the ends, wherein the magnets of the first and second magnet assemblies are spaced from each other by a gap with like polarized poles facing each other, with the pole of the magnet in the first magnet assembly facing the gap being in a first pole plane and the pole of the magnet in the second magnet assembly facing the gap being in a second pole plane.

8. The apparatus of claim 7 further comprising a first flux plate on which the first magnet is mounted, a first pair of clamps which holds the first magnet to the first flux plate, a second flux plate on which the second magnet is mounted, and a second pair of clamps which holds the second magnet to the second flux plate.

9. The apparatus of claim 8 wherein the first magnet assembly comprises a plurality of bar magnets in a first row transverse to the gap direction and with like polarized poles facing the gap being in the first pole plane, and wherein the second magnet assembly comprises a plurality of bar magnets in a first row transverse to the a gap direction and with like polarized poles facing the gap being in the second pole plane.

10. The apparatus of claim 7 wherein when the second set of flux lines applies a neutralizing field to the magnetic tape to reduce the remanent magnetization on a large wavelength scale it does so without significantly reducing remanent magnetization on a small wavelength scale.

11. An apparatus for producing a uniform magnetic field in a gap to reduce remanent magnetization of a magnetic tape passing through the gap to produce a tape having a plurality of recorded segments separated by cue tones and having a reduced tendency to generate false cue tones, wherein the apparatus comprises means for reducing the remanent magnetization on a large wavelength scale larger than the size of the pigment particles in the tape regardless of whether neutralization on a small scale occurs, and preventing false cue tones from being generated by remanent magnetization by creating a first set of flux lines which run in a first direction, a second set of flux lines which run in a second direction opposite the first direction, and a third set of flux lines which run in the first direction, wherein the second set of flux lines is stronger than the first and third sets of flux lines and applies a saturation field on the tape before the third set of flux lines applies a demagnetization field to the tape, regardless of the existing orientation or direction of the remanent magnetization on the tape, wherein the saturation field has a higher strength than the neutralizing field to switch the magnetic pigment particles in the tape to one direction of magnetization, and wherein the third set of flux lines applies a neutralizing field, having a polarity opposite to that of the saturation field, to the tape, wherein the reducing and preventing means comprises first and second magnet assemblies spaced from each other by a gap with like polarized poles facing each other; wherein the first magnet assembly comprises a plurality of permanent bar magnets, wherein each bar magnet comprises a first magnetically polarized end, a second, opposite, oppositely-magnetically polarized end, and an intervening portion connecting the ends, with the pole of each magnet facing the gap being in a first pole plane, wherein the bar magnets are oriented in first and second adjacent rows transverse to the gap direction with at least one bar magnet in each row, wherein the magnets in the first row have like polarized poles facing the gap, the magnets in the second row have like polarized poles facing the gap, and wherein the second row of poles in the first pole plane has opposite polarity to the first row of poles in the first pole plane; wherein the second magnet assembly comprises a plurality of permanent bar magnets, wherein each bar magnet comprises a first magnetically polarized end,.a second, opposite, oppositely-magnetically polarized end, and an intervening portion connecting the ends, with the pole of each magnet facing the gap being in a second pole plane, wherein the bar magnets are oriented in first and second adjacent rows transverse to the gap direction with at least one bar magnet in each row, wherein the magnets in the first row has like polarized poles facing the gap, the magnets in the second row have like polarized poles facing the gap, and wherein the second row of poles in the second pole plane have opposite polarity to the first row of poles in the second pole plane; and wherein the first set of flux lines flow through one side of both first rows of magnets, the second set of flux lines flow through both rows of magnets, and the third set of flux lines flow through one side of both second rows of magnets.

12. The apparatus of claim 11, wherein when the third set of flux lines applies a neutralizing field to the magnetic tape to reduce the remanent magnetization on a large wavelength scale it does so without significantly reducing remanent magnetization on a small wavelength scale, and further comprising shunting means for adjusting the local field strength of the magnetic field, wherein the shunting means comprises shims of soft magnetic material, and wherein adjustment is performed by placing the shims in the pole planes in areas where the field strength of the gap is to be reduced.

* * * * *